(12) United States Patent
Koh et al.

(10) Patent No.: US 11,038,202 B2
(45) Date of Patent: Jun. 15, 2021

(54) BIS(PHENYL) METHANEDISULFONATE-BASED ADDITIVE AND LITHIUM SECONDARY BATTERY COMPRISING THE SAME

(71) Applicants: Samsung Electronics Co., Ltd., Suwon-si (KR); Samsung SDI Co., Ltd., Yongin-si (KR)

(72) Inventors: Myongchun Koh, Hwaseong-si (KR); Yoonsok Kang, Seongnam-si (KR); Eunha Park, Seoul (KR); Jinah Seo, Seoul (KR)

(73) Assignees: SAMSUNG ELECTRONICS CO., LTD., Gyeonggi-do (KR); SAMSUNG SDI CO., LTD., Gyeonggi-do (KR)

( * ) Notice: Subject to any disclaimer, the term of this patent is extended or adjusted under 35 U.S.C. 154(b) by 126 days.

(21) Appl. No.: 16/049,963

(22) Filed: Jul. 31, 2018

(65) Prior Publication Data

US 2019/0058218 A1   Feb. 21, 2019

(30) Foreign Application Priority Data

Aug. 16, 2017 (KR) .................. 10-2017-0103722

(51) Int. Cl.

| H01M 10/0567 | (2010.01) |
|---|---|
| H01M 4/505 | (2010.01) |
| H01M 4/525 | (2010.01) |
| H01M 10/0525 | (2010.01) |
| H01M 4/587 | (2010.01) |
| H01M 4/36 | (2006.01) |
| H01M 4/38 | (2006.01) |
| H01M 4/02 | (2006.01) |

(52) U.S. Cl.
CPC ....... *H01M 10/0567* (2013.01); *H01M 4/505* (2013.01); *H01M 4/525* (2013.01); *H01M 10/0525* (2013.01); *H01M 4/364* (2013.01); *H01M 4/386* (2013.01); *H01M 4/587* (2013.01); *H01M 2004/028* (2013.01); *H01M 2300/004* (2013.01); *H01M 2300/0025* (2013.01)

(58) Field of Classification Search
CPC ......... H01M 10/0567; H01M 10/0525; H01M 4/505; H01M 4/525
USPC ........................................................ 429/332
See application file for complete search history.

(56) References Cited

U.S. PATENT DOCUMENTS

| 8,716,513 | B2 | 5/2014 | Okamoto et al. | |
|---|---|---|---|---|
| 9,012,071 | B2 | 4/2015 | Utsugi et al. | |
| 10,050,304 | B2 | 8/2018 | Onozuka et al. | |
| 2002/0164479 | A1* | 11/2002 | Matsubara | H01M 4/366 |
| | | | | 428/367 |
| 2009/0081547 | A1* | 3/2009 | Nakura | H01M 4/131 |
| | | | | 429/219 |
| 2010/0062332 | A1 | 3/2010 | Kumeuchi | |
| 2014/0154587 | A1* | 6/2014 | Abe | C07C 309/65 |
| | | | | 429/332 |
| 2015/0125742 | A1 | 5/2015 | Yokotsuji et al. | |
| 2015/0132664 | A1* | 5/2015 | Kim | H01M 10/0567 |
| | | | | 429/334 |
| 2015/0140448 | A1 | 5/2015 | Takiguchi et al. | |
| 2015/0364735 | A1* | 12/2015 | Kohira | H01M 4/525 |
| | | | | 429/55 |
| 2016/0028123 | A1* | 1/2016 | Kawasaki | H01M 10/0569 |
| | | | | 429/336 |
| 2016/0049691 | A1 | 2/2016 | Suzuki et al. | |

(Continued)

FOREIGN PATENT DOCUMENTS

| EP | 2744030 A1 | 6/2014 |
|---|---|---|
| EP | 2827433 A1 | 1/2015 |
| JP | 5012767 B2 | 8/2012 |

(Continued)

OTHER PUBLICATIONS

EESR issued by the European Patent Office dated Jan. 24, 2019 in the examination of the European Patent Application No. 18186807.6, which corresponds to the U.S. Appl. No. 16/049,963.

*Primary Examiner* — Sean P Cullen
(74) *Attorney, Agent, or Firm* — Cantor Colburn LLP

(57) ABSTRACT

An electrolyte includes: a lithium salt; a non-aqueous solvent; and a disulfonate compound represented by Formula 1:

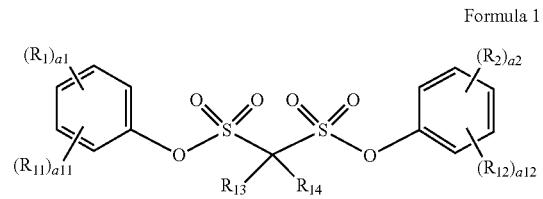

Formula 1 wherein, in Formula 1, $R_1$ and $R_2$ are each independently a fluorine, a cyano group, a nitro group, or a methyl group substituted with at least one fluorine, $R_{11}$ to $R_{14}$ are each independently a hydrogen, a deuterium, a fluorine, a hydroxyl group, a cyano group, a nitro group, a substituted or unsubstituted $C_1$-$C_{10}$ alkyl group, a substituted or unsubstituted $C_2$-$C_{10}$ alkenyl group, or a substituted or unsubstituted $C_2$-$C_{10}$ alkynyl group, a1 and a2 are each independently an integer of 1 to 5, a11 and a12 are each independently an integer of 0 to 4, and a sum of a1 and a11 is 5, and a sum of a2 and a12 is 5.

20 Claims, No Drawings

(56) References Cited

U.S. PATENT DOCUMENTS

2016/0218392 A1* 7/2016 Lee .................. H01M 10/0569
2016/0233544 A1* 8/2016 Kim .................. H01M 10/0567

FOREIGN PATENT DOCUMENTS

| JP | 5098171 B2 | 12/2012 | |
| JP | 2013227267 A | 11/2013 | |
| JP | 5884885 B2 | 3/2016 | |
| KR | 1020100029722 A | 3/2010 | |
| KR | 101313398 B1 | 10/2013 | |
| KR | 1020150145980 A | 12/2015 | |
| WO | 2015037382 A1 | 3/2015 | |
| WO | WO-2017013111 A1 * | 1/2017 | ............ H01M 4/386 |

* cited by examiner

BIS(PHENYL) METHANEDISULFONATE-BASED ADDITIVE AND LITHIUM SECONDARY BATTERY COMPRISING THE SAME

CROSS-REFERENCE TO RELATED APPLICATION

This application claims priority to and the benefit of Korean Patent Application No. 10-2017-0103722, filed on Aug. 16, 2017, in the Korean Intellectual Property Office, and all the benefits accruing therefrom under 35 U.S.C. § 119, the content of which in its entirety is incorporated herein by reference.

BACKGROUND

1. Field

The present disclosure relates to a disulfonate-based additive and a lithium secondary battery including the same.

2. Description of the Related Art

Lithium batteries may be used as a power source for portable electronic devices, such as video cameras, mobile phones, laptop computers, and the like. Rechargeable lithium batteries, i.e., lithium secondary batteries, may have an energy density per unit weight that is three or more times greater than the energy density of a lead storage battery, a nickel-cadmium battery, a nickel-hydrogen battery, a nickel-zinc battery, and the like, and may be rapidly charged.

In general, a lithium secondary battery utilizes a lithium-containing metal oxide as a positive active material. For example, a composite oxide of lithium and a metal such as cobalt (Co), manganese (Mn), nickel (Ni), or a combination thereof may be used. Of these positive active materials, a positive active material containing a high content of Ni may provide greater capacity, compared to a lithium cobalt oxide.

However, when the amount of Ni in the positive active material is too high, the positive electrode may have a weak surface structure, resulting in a battery having poor lifetime characteristics and increased resistance.

Therefore, there is a need for a lithium secondary battery including a positive active material having improved capacity and improved lifetime characteristics.

SUMMARY

Provided is an electrolyte and a lithium secondary battery including the electrolyte.

According to an aspect of an embodiment, an electrolyte includes: a lithium salt; a non-aqueous solvent; and a disulfonate compound represented by Formula 1:

Formula 1

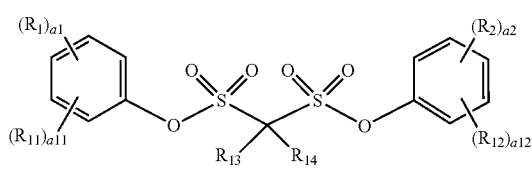

wherein, in Formula 1, $R_1$ and $R_2$ are each independently a fluorine, a cyano group, a nitro group, or a methyl group substituted with at least one fluorine, $R_{11}$ to $R_{14}$ are each independently a hydrogen, a deuterium, a fluorine, a hydroxyl group, a cyano group, a nitro group, a substituted or unsubstituted $C_1$-$C_{10}$ alkyl group, a substituted or unsubstituted $C_2$-$C_{10}$ alkenyl group, or a substituted or unsubstituted $C_2$-$C_{10}$ alkynyl group, a1 and a2 are each independently an integer of 1 to 5, a11 and a12 are each independently an integer of 0 to 4, and a sum of a1 and a11 is 5, and a sum of a2 and a12 is 5.

According to an aspect of another embodiment, a lithium secondary battery includes: a positive electrode; a negative electrode; and the above-described electrolyte disposed between the positive electrode and the negative electrode, wherein the positive electrode includes a positive active material represented by Formula 2

Formula 2

$Li_xNi_yM_{1-y}O_{2-z}A_z$ wherein, in Formula 2, 0.9≤x≤1.2, 0.1≤y≤0.98, 0≤z<0.2, M includes Al, Mg, Mn, Co, Fe, Cr, V, Ti, Cu, B, Ca, Zn, Zr, Nb, Mo, Sr, Sb, W, Bi, or a combination thereof, and A is an element having an oxidation number of −1, −2 or −3.

Additional aspects will be set forth in part in the description which follows and, in part, will be apparent from the description, or may be learned by practice of the presented embodiments.

DETAILED DESCRIPTION

Reference will now be made in detail to embodiments. In this regard, the present embodiments may have different forms and should not be construed as being limited to the descriptions set forth herein. Accordingly, the embodiments are merely described below, to explain aspects.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, an alkyl group indicates a completely saturated, branched or unbranched (or a straight or linear) hydrocarbon group.

Non-limiting examples of the alkyl group may include a methyl group, an ethyl group, a n-propyl group, an isopropyl group, a n-butyl group, an isobutyl group, a sec-butyl group, a t-butyl group, an isopentyl group, a neopentyl group, a n-hexyl group, a 3-methylhexyl group, a 2,2-dimethylpentyl group, a 2,3-dimethylpentyl group, and a n-heptyl group.

At least one hydrogen atom of the alkyl group may be substituted with a halogen atom, a $C_1$-$C_{20}$ alkyl group substituted with a halogen atom (for example, $CF_3$, $CH_3CF_2$, $CH_2F$, $CCl_3$), a $C_1$-$C_{20}$ alkoxy group, a $C_2$-$C_{20}$ alkoxyalkyl group, a hydroxyl group (—OH), a nitro group (—$NO_2$), a cyano group (—CN), an amino group (—$NH_2$), an alkylamino group (RNH— wherein R is a $C_1$-$C_{10}$ alkyl group), a dialkylamino group ($R_2N$— wherein each R is the same or different $C_1$-$C_{10}$ alkyl group), an amidino group (—C(=NH)$NH_2$), a hydrazino group (—$NHNH_2$), a hydrazono group (=N—$NH_2$), a carbamoyl group (—C(O)$NH_2$), a carboxyl group or a salt thereof (—C(=O)OX wherein X is a hydrogen or a counter ion), a sulfonyl group (—S(=O)$_2$—), a sulfamoyl group ($NH_2$—$SO_2$—), a sulfonic acid group or a salt thereof (—$SO_3X_2$ wherein X is a hydrogen or a counter ion), a phosphoric acid group or a salt thereof (—$PO_3X_2$ wherein X is a hydrogen or a counter ion), a tosyl ($CH_3C_6H_4SO_2$—), a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_7$-$C_{20}$ arylalkyl group, a $C_4$-$C_{20}$ heteroaryl group, a $C_5$-$C_{20}$ heteroarylalkyl group, a $C_4$-$C_{20}$ heteroaryloxy group, or a $C_5$-$C_{20}$ heteroaryloxyalkyl group, provided that the substituted atom's normal valence is not exceeded.

As used herein, an alkenyl group refers to an aliphatic hydrocarbon group including one or more double bonds. An alkynyl group refers to an aliphatic hydrocarbon group including one or more triple bonds. At least one hydrogen atom in the alkenyl or alkynyl group may be substituted with one of the substituents as described above in connection with the alkyl group. The indicated total number of carbon atoms for a group does not include any substituents if present.

As used herein, an alkynyl group means a straight or branched chain, monovalent hydrocarbon group having at least one carbon-carbon triple bond (e.g., ethynyl).

As used herein, "cycloalkyl" means a monovalent group having one or more saturated rings in which all ring members are carbon, e.g., cyclopentyl and cyclohexyl.

As used herein, the term "electron withdrawing group" refers to a halogen atom, nitro group, cyano group, C1 to C2 haloalkyl group, C1 to C6 alkanoyl group, C1 to C6 ester group, etc.

Hereinafter, example embodiments of an electrolyte and a lithium secondary battery including the electrolyte will now be described in greater detail.

According to an aspect of the present disclosure, an electrolyte includes: a lithium salt; a non-aqueous solvent; and a disulfonate compound represented by Formula 1:

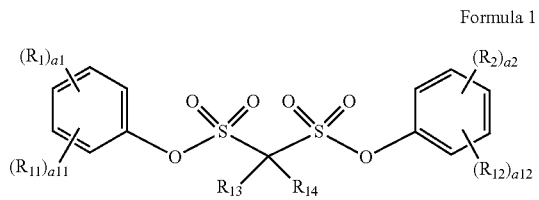

Formula 1

In Formula 1,
$R_1$ and $R_2$ may each independently be a fluorine, a cyano group, a nitro group, or a methyl group substituted with at least one fluorine;
$R_{11}$ to $R_{14}$ may each independently be a hydrogen, a deuterium, fluorine, a hydroxyl group, a cyano group, a nitro group, a substituted or unsubstituted $C_1$-$C_{10}$ alkyl group, a substituted or unsubstituted $C_2$-$C_{10}$ alkenyl group, or a substituted or unsubstituted $C_2$-$C_{10}$ alkynyl group;
a1 and a2 may each independently be an integer of 1 to 5;
a11 and a12 may each independently be an integer of 0 to 4; and
a sum of a1 and a11 may be 5, and a sum of a2 and a12 may be 5.

In some embodiments, the compound of Formula 1 may have a structure represented by Compound 1 or Compound 2 below.

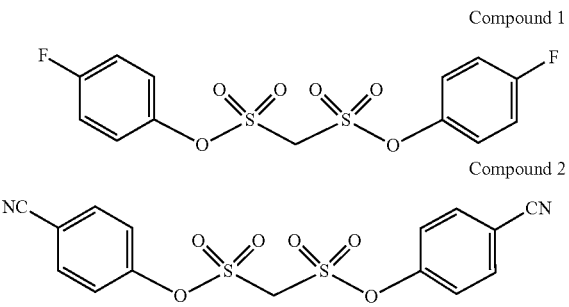

Compound 1

Compound 2

As described in further detail below, when used as a positive electrode material, a lithium metal composite oxide having a high Ni content may cause serious deterioration in battery lifetime characteristics, such as capacity retention or resistance increase rate, despite its ability to provide high-capacity to the battery. Due to these drawbacks, commercialization of the lithium metal composite oxide having a high Ni content has been difficult. Without being limited by theory, it is believed that the deterioration in capacity retention and resistance increase are mainly caused by the release of $Ni^{3+}$ cations from the positive electrode to the electrolyte or by disproportionation in which NiO is formed via conversion of some $Ni^{3+}$ cations to $Ni^{4+}$ cations during discharging of a battery. Accordingly, deterioration in battery lifetime characteristics and resistance increase may occur. To address these drawbacks, the lithium secondary battery according an embodiment may include the electrolyte containing a disulfonate-based compound represented by Formula 1 to protect $Ni^{3+}$ cations from being released and prevent disproportionation.

In particular, without being limited by theory, it is understood that the disulfonate-based compound of Formula 1 has a high affinity for $Ni^{3+}$ cations and thus inhibits side reactions of $Ni^{3+}$ cations, and in particular, maintains a high affinity for $Ni^{3+}$ cations even when a battery is operated at a high voltage, thereby inhibiting the release of $Ni^{3+}$ cations, oxidation of $Ni^{3+}$ cations into $Ni^{4+}$ cations, and disproportionation.

In some embodiments, the amount of the disulfonate-based compound in the electrolyte may be less than 3 weight percent (wt %), based on a total weight of the electrolyte. However, embodiments are not limited thereto. The disulfonate-based compound may be added in any amount that is sufficient to protect $Ni^{3+}$ cations and maintain lifetime characteristics of the battery. When the amount of the disulfonate-based compound exceeds 3 wt %, the disulfonate-based compound itself may be decomposed, thereby increasing film resistance and deteriorating battery capacity, storage stability, and cycle characteristics.

For example, the amount of the disulfonate-based compound may be from about 0.1 wt % or greater to less than about 3 wt % based on a total weight of the electrolyte. In some embodiments, the amount of the disulfonate-based compound may be from about 0.1 wt % or greater to about 2 wt % or less, and in some other embodiments, about 0.2 wt % or greater to about 2.0 wt % or less, and in still other embodiments, about 1 wt % or greater to about 2 wt % or less, based on a total weight of the electrolyte.

When the amount of the disulfonate-based compound is less than 0.1 wt %, the amount of the disulfonate-based compound may be too small to form a protective film and to obtain a sufficient resistance reduction effect.

In some embodiments, the substituent of the substituted $C_1$-$C_{10}$ alkyl group, the substituted $C_2$-$C_{10}$ alkenyl group, and the substituted $C_2$-$C_{10}$ alkynyl group may be:

a deuterium (D), F, Cl, Br, I, a hydroxyl group, a cyano group, a nitro group, a $C_1$-$C_{10}$ alkyl group, a $C_2$-$C_{10}$ alkenyl group, a $C_2$-$C_{10}$ alkynyl group, or a $C_1$-$C_{10}$ alkoxy group, or a combination thereof;

a $C_1$-$C_{10}$ alkyl group, a $C_2$-$C_{10}$ alkenyl group, a $C_2$-$C_{10}$ alkynyl group, or a $C_1$-$C_{10}$ alkoxy group, substituted with a deuterium, —F, Cl, Br, I, a hydroxyl group, a cyano group, a nitro group, a $C_3$-$C_{10}$ cycloalkyl group, a $C_3$-$C_{10}$ cycloalkenyl group, a $C_6$-$C_{20}$ aryl group, a $C_6$-$C_{20}$ aryloxy group, a $C_6$-$C_{20}$ arylthio group, or a combination thereof; or a $C_3$-$C_{10}$ cycloalkyl group, a $C_3$-$C_{10}$ cycloalkenyl group, a $C_6$-$C_{20}$ aryl group, a $C_6$-$C_{20}$ aryloxy group, a $C_6$-$C_{20}$ arylthio group, a monovalent non-aromatic condensed polycyclic group, or a combination thereof.

In some embodiments, $R_1$ and $R_2$ may each independently be a fluorine (F) or a cyano group. For example, $R_1$ and $R_2$ may be the same. However, embodiments are not limited thereto. For example, $R_1$ and $R_2$ may be different from each other. However, embodiments are not limited thereto.

In some embodiments, a1 and a2 may each independently be 1, 2, or 5. When a1 is 2 or greater, the $R_1$ groups may be the same or different from each other. When a2 is 2 or greater, the R2 groups may be the same or different from each other.

As described above, when the disulfonate-based compound of Formula 1 includes a phenyl group and at least one electron withdrawing group (EWG) as a substituent, and when the electrolyte including the disulfonate-based compound is in contact with or near to a positive electrode of a lithium secondary battery, the disulfonate-based compound may improve resistance of the positive electrode against oxidative decomposition and consistently protect $Ni^{3+}$ cations of the positive electrode, thus providing a positive electrode deterioration inhibitory effect.

In some embodiments, $R_{11}$ to $R_{14}$ may each independently be a hydrogen, a substituted or unsubstituted $C_1$-$C_{10}$ alkyl group, a substituted or unsubstituted $C_2$-$C_{10}$ alkenyl group, or a combination thereof. For example, $R_{11}$ to $R_{14}$ may each independently be hydrogen, a methyl group, an ethyl group, an ethenyl group, an ethenyl group substituted with a methyl group, or a combination thereof. However, embodiments are not limited thereto.

In some embodiments, the disulfonate-based compound may be bis(fluorophenyl) methanedisulfonate, bis(difluorophenyl) methanedisulfonate, bis(pentafluorophenyl) methanedisulfonate, Compound 2, or a combination thereof.

Compound 2

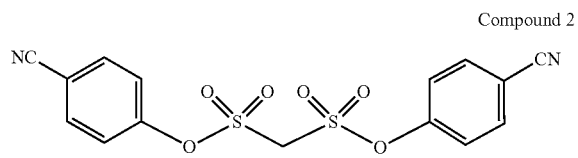 [SMILES: N#Cc1ccc(OS(=O)(=O)CS(=O)(=O)Oc2ccc(C#N)cc2)cc1]

In some embodiments, the electrolyte may include a lithium salt. The lithium salt may serve as a source of lithium ions in the battery, and may be, for example, dissolved in an organic solvent to facilitate migration of lithium ions between the positive electrode and the negative electrode.

Anions of the lithium salt in the electrolyte may include $PF_6^-$, $BF_4^{31}$, $SbF_6^-$, $AsF_6^-$, $C_4F_9SO_3^-$, $ClO_4^-$, $AlO_2^-$, $AlCl_4^-$, $C_xF_{2x+1}SO_3^-$ (wherein x is a natural number), $(C_xF_{2x+1}SO_2)(C_yF_{2y+1}SO_2)N^-$ (wherein x and y are natural numbers), a halide, or a combination thereof.

For example, the lithium salt may include lithium difluoro (oxalato)borate (LiDFOB), lithium bis(oxalato)borate (LiBOB), lithium difluoro bis(oxalate) phosphate (LiDFOP), $LiBF_4$, $LiPF_6$, $LiCF_3SO_3$, $(CF_3SO_2)_2NLi$, $(FSO_2)_2NLi$, or a combination thereof. For example, the lithium salt may be $LiPF_6$. The structure of lithium difluoro(oxalato)borate (LiDFOB) is illustrated below.

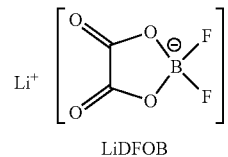

LiDFOB

A combination comprising at least two of the foregoing lithium salts may be used.

In some embodiments, the lithium salt may include, for example, about 0.6 molar (M) to about 2 M $LiPF_6$ as a primary salt, and another salt including lithium difluoro (oxalato)borate (LiDFOB), lithium bis(oxalate)borate (LiBOB), lithium difluoro bis(oxalate) phosphate (LiDFOP), $LiBF_4$, $LiCF_3SO_3$, $(CF_3SO_2)_2NLi$, $(FSO_2)_2NLi$, or a combination thereof, in an amount not exceeding the amount of the primary salt.

In some embodiments, the lithium salt may include, for example, about 1 molar (M) to about 2 M $LiPF_6$ as a main salt, and another salt including lithium difluoro(oxalato) borate (LiDFOB), lithium bis(oxalate)borate (LiBOB), lithium difluoro bis(oxalate) phosphate (LiDFOP), $LiBF_4$, $LiCF_3SO_3$, $(CF_3SO_2)_2NLi$, $(FSO_2)_2NLi$, or a combination thereof, in an amount not exceeding the amount of the primary salt.

In some other embodiments, the lithium salt may include about 1 M to about 1.5 M $LiPF_6$ as a primary salt, and another salt including lithium difluoro(oxalato)borate (LiDFOB), lithium bis(oxalate)borate (LiBOB), lithium difluoro bis(oxalate) phosphate (LiDFOP), LiBF$_4$, LiCF$_3$SO$_3$, (CF$_3$SO$_2$)$_2$NLi, (FSO$_2$)$_2$NLi, or a combination thereof, in an amount of about 0.5 wt % to about 10 wt %, or about 0.5 wt % to about 7.5 wt %, or about 1 wt % to about 7.5 wt %, based on a total weight of the electrolyte.

For example, the non-aqueous solvent may include a carbonate solvent, an ester solvent, a ketone solvent, an aprotic solvent, or a mixture thereof.

Non-limiting examples of the carbonate solvent may include dimethyl carbonate (DMC), diethyl carbonate (DEC), ethyl methyl carbonate (EMC), dipropyl carbonate (DPC), methylpropyl carbonate (MPC), ethylpropyl carbonate (EPC), ethylene carbonate (EC), propylene carbonate (PC), and butylene carbonate (BC). Non-limiting examples of the ester solvent may be methyl acetate, ethyl acetate, n-propyl acetate, t-butyl acetate, methyl propionate, ethyl propionate, γ-butyrolactone (GBL), decanolide, valerolactone, mevalonolactone, and caprolactone. An example of the ketone solvent may be cyclohexanone. A combination comprising at least two of the foregoing solvents may also be used.

The aprotic solvent may be used alone or in combination with at least one of the other solvents. For example, a volume ratio of these solvents may be appropriately controlled according to the performance of a battery, and may be determined by one of ordinary skill in the art without undue experimentation.

In some embodiments, the carbonate solvent may be a mixture of a linear carbonate and a cyclic carbonate. When a ratio of the linear carbonate to the cyclic carbonate is about 1:1 to about 9:1, or about 2:1 to about 8:1, or about 3:1 to about 7:1 by volume, the electrolyte may have improved performance.

In some other embodiments, the non-aqueous solvent may further include fluoroethylene carbonate (FEC), vinylene carbonate (VC), vinyl ethylene carbonate (VEC), a phosphorus (P)-containing compound, a sulfur (S)-containing compound other than the disulfonate compound represented by Formula 1, or the like. A combination comprising at least two of the foregoing may also be used.

In some embodiments, the non-aqueous solvent may include fluoroethylene carbonate (FEC). For example, the lithium secondary battery may include FEC in an amount of about 0.1 volume percent (vol %) to about 10 vol % based on a total volume of the non-aqueous solvent. In some embodiments, the lithium secondary battery may include FEC in an amount of about 0.5 vol % to about 7 vol %, and in some other embodiments, about 1 vol % to about 7 vol %, and in some other embodiments, about 2 vol % to about 7 vol %, each based on a total volume of the non-aqueous solvent. When the amount of the FEC in the non-aqueous solvent is within the above-described ranges, an effective solid-electrolyte interphase (SEI), which does not inhibit the diffusion rate of lithium ions, may be rapidly formed.

The electrolyte may include a carbonate including a carbon-carbon single bond, a carbonate including a carbon-carbon double bond, a carbonate including a carbon-carbon triple bond, a carboxylic anhydride including a carbon-carbon double bond, a carboxylic anhydride including a carbon-carbon triple bond, or a combination thereof. The carbonate and the carboxylic anhydride may be linear or cyclic.

For example, the electrolyte may further include a vinylene carbonate (VC), a vinyl ethylene carbonate (VEC), a maleic anhydride, a succinic anhydride, or a combination thereof. For example, the lithium secondary battery may further include VC, VEC, a maleic anhydride, a succinic anhydride, or a combination thereof in an amount of about 0.1 wt % to about 3 wt %, and in some embodiments, about 0.1 wt % to about 2 wt %, or about 0.1 wt % to about 1.5 wt %, based on a total weight of the electrolyte.

For example, the electrolyte may further include a maleic anhydride. However, embodiments are not limited thereto. For example, the lithium secondary battery may further include a maleic anhydride in an amount of about 0.1 wt % to about 1.5 wt %, and in some embodiments, about 0.1 wt % to about 1 wt %, and in some other embodiments, about 0.1 wt % to about 0.5 wt %, based on a total weight of the electrolyte.

For example, the electrolyte may further include a phosphorous (P)-containing compound, a sulfur (S)-containing compound other than the disulfonate compound represented by Formula 1, or a combination thereof. For example, the electrolyte may further include a phosphorous (P)-containing compound, a sulfur (S)-containing compound other than the disulfonate compound represented by Formula 1, or a combination thereof in an amount of about 4 wt % or less, in some embodiments, about 0.1 wt % or greater to about 3 wt % or less, and in some other embodiments, about 0.1 wt % or greater to about 2 wt % or less, and in still other embodiments, about 0.5 wt % to about 2 wt %, based on a total weight of the electrolyte.

The P-containing compound may include a phosphine compound, a phosphite compound, or a combination thereof. The S-containing compound may include a sulfone compound, a sulfonate compound, a disulfonate compound, or a combination thereof. In an embodiment, the electrolyte may not include the P-containing compound, and for example, the electrolyte may not contain a phosphite compound.

The phosphine compound may include, for example, triphenylphosphine, tris(o-tolyl)phosphine, tris(butyl)phosphine, or a combination thereof. However, embodiments are not limited thereto. For example, the phosphite compound may include triethylphosphite (TEPi), trimethylphosphite, tripropylphosphite, tributylphosphite, tris (trimethylsilyl) phosphite, triphenylphosphite, or a combination thereof. However, embodiments are not limited thereto.

The sulfone compound may include, for example, ethylmethyl sulfone, divinyl sulfone, tetramethylene sulfone, bisphenylsulfone, or a combination thereof. However, embodiments are not limited thereto. For example, the sulfonate compound may be methyl methane sulfonate, ethyl methane sulfonate, diallyl sulfonate, or a combination thereof. However, embodiments are not limited thereto. The disulfonate compound may be, for example, methylene methane disulfonate (MMDS), busulfan, methylene bis(methansulfonate), or a combination thereof. However, embodiments are not limited thereto.

According to another aspect of the present disclosure, a lithium secondary battery includes a positive electrode; a negative electrode; and the electrolyte according to any of the above-described embodiments disposed between the positive electrode and the negative electrode, wherein the positive electrode include a positive active material represented by Formula 2.

Formula 2

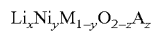

In Formula 2, $0.9 \leq x \leq 1.2$, $0.1 \leq y \leq 0.98$, $0 \leq z < 0.2$,

M may include Al, Mg, Mn, Co, Fe, Cr, V, Ti, Cu, B, Ca, Zn, Zr, Nb, Mo, Sr, Sb, W, Bi, or a combination thereof; and A may be an element having an oxidation number of −1, −2 or −3.

For example, in Formula 2, A may be a halogen, S, N, or a combination thereof. However, embodiments are not limited thereto.

For example, in Formula 2, y, which indicates an amount of Ni in the positive active material, may satisfy 0.7≤y≤0.98, and in some embodiments, 0.8≤y≤0.98, and in some other embodiments, 0.8≤y≤0.9, and in still other embodiments, 0.8≤y≤0.88. When the amount of Ni in the positive active material is less than 70% of the positive active material, the amount of Ni may be small enough to stabilize the surface of the positive electrode and inhibit deterioration in lifetime characteristics of the battery, such as the release of $Ni^{3+}$ cations or disproportionation which occurs when using a high-Ni positive active material, however, resistance may be increased since sulfonate having an affinity for $Ni^{3+}$ cations is located on a surface of the positive electrode, thus leading to an overall reduction in lifetime characteristics and resistance characteristics of the battery.

For example, the positive active material may be represented by Formula 3 or Formula 4.

Formula 3

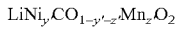

$LiNi_{y'}Co_{1-y'-z'}Mn_{z'}O_2$

Formula 4

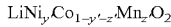

$LiNi_{y'}Co_{1-y'-z'}Mn_{z'}O_2$

In Formulae 3 and 4, 0.9≤x'≤1.2, 0.8≤y'≤0.98, 0<z'<0.1, and 0<1−y'−z'<0.2.

For example, the positive electrode may include, as a positive active material, $LiNi_{0.80}Co_{0.15}Mn0.05 O_2$, $LiNi_{0.85}Co_{0.1}Mn_{0.05}O_2$, $LiNi_{0.88}Co_{0.08}Mn_{0.04}O_2$, $LiNi_{0.88}Co_{0.08}Al_{0.04}O_2$, $Li_{1.02}Ni_{0.88}Co_{0.15}Mn_{0.05}O_2$, $Li_{1.02}Ni_{0.85}Co_{0.10}Mn_{0.05}O_2$, $Li_{1.02}Ni_{0.88}Co_{0.08}Mn_{0.04}O_2$, $Li_{1.02}Ni_{0.88}Co_{0.08}Al_{0.04}O_2$, $LiNi_{0.8}Co_{0.15}Al_{0.05}O_2$, $LiNi_{0.88}Co_{0.1}A_{0.02}O_2$, $LiNi_{0.88}Co_{0.1}Mn_{0.02}O_2$, $LiNi_{0.85}Co_{0.1}Al_{0.05}O_2$, $LiNi_{0.88}Co_{0.1}Mn_{0.02}O_2$, or a combination thereof. For example, the positive electrode may include, as a positive active material, at least one of $LiNi_{0.8}Co_{0.15}Mn_{0.05}O_2$, $LiNi_{0.85}Co_{0.1}Mn_{0.05}O_2$, $LiNi_{0.88}Co_{0.08}Mn_{0.04}O_2$, $LiNi_{0.88}Co_{0.08}Al_{0.04}O_2$, $Li_{1.02}Ni_{0.80}Co_{0.15}Mn_{0.5}O_2$, $Li_{1.02}Ni_{0.85}Co_{0.10}Mn_{0.05}O_2$, $Li_{1.02}Ni_{0.88}Co_{0.08}Mn_{0.04}O_2$, $Li_{1.02}Ni_{0.88}Co_{0.08}Al_{0.04}O_2$, or a combination thereof. However, embodiments are not limited thereto.

As described above, in spite of the ability to implement a high-capacity battery, a lithium metal oxide having a high Ni content may lead to poor lifetime characteristics and an increased resistance in a prior art battery due to an increase in the amount of $Ni^{3+}$ cations. However, in a lithium secondary battery according to one or more embodiments, by including the disulfonate-based compound of Formula 1, the disulfonate moiety of the disulfonate-based compound may react with, and thereby stabilize the $Ni^{3+}$ cations, and thus reduce resistance. In this regard, when the amount of the disulfonate-based compound is greater than 3 wt % based on a total weight of the electrolyte, the disulfonate moiety of the disulfonate-based compound may react with lithium cations generated from the positive active material, thereby consuming the lithium cations so that they are no longer available to participate in the charge/discharge process.

The disulfonate-based compound represented by Formula 1 may be susceptible to decomposition by reaction with the negative electrode. As described in additional detail below, in a lithium secondary battery containing a negative active material including a metal alloyable with lithium or a carbonaceous negative active material, gas may be generated by a catalytic reaction when the battery is operated at a high temperature, and as a result, the lifetime characteristics of the battery may deteriorate. When FEC, VC, VEC, a phosphorous (P)-containing compound, a sulfur (S)-containing compound other than the disulfonate compound represented by Formula 1, or a combination thereof is included in electrolyte, in the above-described ranges, a passivation layer, i.e., a SEI layer, may be formed on a surface of the negative electrode. The SEI layer may form on a portion of the surface of the negative electrode or on the entire surface of the electrode. Without being limited by theory, it is understood that the SEI layer may prevent generation of gas during storage at a high temperature, and thus improve both the safety and performance of the lithium secondary battery.

In addition to the positive active material described above, the positive electrode may also include an additional positive active material. The positive active material may include a lithium cobalt oxide, a lithium nickel cobalt manganese oxide, a lithium nickel cobalt aluminum oxide, a lithium iron phosphate, a lithium manganese oxide, or a combination thereof. However, embodiments are not limited thereto. The positive electrode may further include any suitable positive active materials.

For example, the positive electrode may further include a compound represented by one of the following formulae: $Li_aA_{1-b}B'_bD_2$ (wherein 0.90≤a≤1.8, and 0≤b≤0.5); $Li_aE_{1-b}B'_bO_{2-c}D_c$ (wherein 0.90≤a≤1.8, 0≤b≤0.5, and 0≤c≤0.05); $LiE_{2-b}B'_bO_{4-c}D_c$ (wherein 0≤b≤0.5, and 0≤c≤0.05); $Li_aNi_{1-b-c}Co_bB'_cD_\alpha$ (wherein 0.90≤a≤1.8, 0≤b≤0.05, 0≤c≤0.05, and 0<α≤2); $Li_aNi_{1-b-c}Co_bB'_cO_{2-\alpha}F'_\alpha$ (wherein 0.90≤a≤1.8, 0≤b≤0.05, 0≤c≤0.05, and 0<α<2); $Li_aNi_{1-b-c}Mn_bB'_cD_\alpha$ (wherein 0.90≤a≤1.8, 0≤b≤0.05, 0≤c≤0.05, and 0<a≤2); $Li_aNi_{1-b-c}Mn_bB'_cO_{2-\alpha}F'_\alpha$ (wherein 0.90≤a≤1.8, 0≤b≤0.05, 0≤c≤0.05, and 0<α<2); $Li_aNi_bE_cG_dO_2$ (wherein 0.90≤a≤1.8, 0≤b≤0.9, 0≤c≤0.5, and 0.001≤d≤0.1); $Li_aNi_bCo_cMn_dG_eO_2$ (wherein 0.90≤a≤1.8, 0≤b≤0.9, 0≤c≤0.5, 0≤d≤0.5, and 0.001≤e≤0.01); $Li_aNiG_bO_2$ (wherein 0.90≤a≤1.8, and 0.001≤b≤0.1); $Li_aCoG_bO_2$ (wherein 0.90≤a≤1.8, and 0.001≤b≤0.1); $Li_aMnG_bO_2$ (wherein 0.90≤a≤1.8, and 0.001≤b≤0.1); $Li_aMn_2G_bO_4$ (wherein 0.90≤a≤1.8, and 0.001≤b≤0.1); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein 0≤f≤2); $Li_{(3-f)}Fe_2(PO_4)_3$ (wherein 0≤f≤2); or $LiFePO_4$. A combination comprising at least two of the foregoing may also be used.

In the formulae above, A may be Ni, Co, Mn, or a combination thereof; B' may be Al, Ni, Co, Mn, Cr, Fe, Mg, Sr, V, a rare earth element, or a combination thereof; D may be O, F, S, P, or a combination thereof; E may be Co, Mn, or a combination thereof; F' may be F, S, P, or a combination thereof; G may be Al, Cr, Mn, Fe, Mg, La, Ce, Sr, V, or a combination thereof; Q may be Ti, Mo, Mn, or a combination thereof; I' may be Cr, V, Fe, Sc, Y, or a combination thereof; and J may be V, Cr, Mn, Co, Ni, Cu, or a combination thereof.

In an embodiment, a method of preparing the positive electrode of the lithium secondary battery according to any of the embodiments includes providing a positive electrode and a negative electrode, and disposing an electrolyte between the positive electrode and the negative electrode, wherein the electrolyte includes: a lithium salt, a non-aqueous solvent, and a disulfonate compound represented by Formula 1:

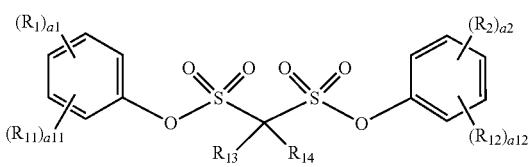

wherein, in Formula 1, $R_1$ and $R_2$ are each independently a fluorine, a cyano group, a nitro group, or a methyl group substituted with at least one fluorine, $R_{11}$ to $R_{14}$ are each independently a hydrogen, a deuterium, a fluorine, a hydroxyl group, a cyano group, a nitro group, a substituted or unsubstituted $C_1$-$C_{10}$ alkyl group, a substituted or unsubstituted $C_2$-$C_{10}$ alkenyl group, or a substituted or unsubstituted $C_2$-$C_{10}$ alkynyl group, a1 and a2 are each independently an integer of 1 to 5, a11 and a12 are each independently an integer of 0 to 4, and a sum of a1 and a11 is 5, and a sum of a2 and a12 is 5.

The positive electrode may be formed by coating, drying, and then pressing a positive active material composition onto a positive electrode current collector. A positive active material composition may be prepared as a mixture of the positive active material as described above, a binder, and a solvent as needed.

For example, a conducting agent, a filler, or the like, or a combination thereof may be further added to the positive active material composition. The positive active material composition may be directly coated on the positive electrode current collector and then dried to form a positive electrode. In some other embodiments, the positive active material composition may be cast on a separate support to form a positive active material film. This positive active material film may then be separated from the support and then laminated on the positive electrode current collector, to thereby form the positive electrode.

For example, a loading level of the prepared positive active material composition may be about 30 milligrams per square centimeter (mg/cm$^2$) or greater, and in some embodiments, about 35 mg/cm$^2$ or greater, and in some other embodiments, about 40 mg/cm$^2$ or greater. For example, the positive electrode may have an electrode density of about 3 grams per cubic centimeter (g/cc) or greater, and in some embodiments, about 3.5 g/cc or greater.

In some embodiments, to obtain an increased cell energy density, the loading level of the positive active material composition may be about 35 mg/cm$^2$ or greater to about 50 mg/cm$^2$ or less, and the electrode density of the positive electrode may be about 3.5 g/cc or greater to about 4.2 g/cc or less.

In some embodiments, the positive active material composition may be loaded onto opposite surfaces of the positive electrode current collector to a loading level of about 37 mg/cm$^2$ to achieve an electrode density of about 3.6 g/cc.

When the loading level of the positive active material composition and the electrode density are within the above-described ranges, a lithium secondary battery including the positive active material may have an increased cell energy density of, for example, about 500 watt hours per liter (Wh/L) or greater to about 900 Wh/L or less.

The solvent may be, for example, N-methylpyrrolidone (NMP), acetone, or water. The amount of the solvent may be about 10 parts to about 100 parts by weight based on 100 parts by weight of the positive active material. When the amount of the solvent is within this range, forming the positive active material film may be facilitated.

In general, the conducting agent may be added in an amount of about 1 wt % to about 30 wt % based on a total weight of positive active material composition including the positive active material. The conducting agent may be any material having electrical conductivity, and which does not cause a chemical change in the lithium secondary battery. Non-limiting examples of the conducting agent may include graphite such as natural graphite or artificial graphite; carbon black, acetylene black, Ketjen black, channel black, furnace black, lamp black, or summer black; conductive fibers, such as carbon fibers or metal fibers; carbon fluoride; metal powder, such as aluminum or nickel powder; conductive whiskers, such as zinc oxide or potassium titanate; a conductive metal oxide, such as a titanium oxide; or a conductive polymer material, such as a polyphenylene derivative. A combination comprising at least two of the foregoing may also be used.

The binder may facilitate binding of the positive active material and the conducting agent to the current collector. For example, the amount of the binder may be about 1 wt % to about 30 wt %, or about 2 wt % to about 25 wt %, or about 5 wt % to about 20 wt % based on a total weight of the positive active material composition. Non-limiting examples of the binder include polyvinylidene fluoride (PVdF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, polyethylene, polypropylene, polystyrene, polymethyl methacrylate, polyaniline, acrylonitrile butadiene styrene copolymer, phenol resin, epoxy resin, polyethylene terephthalate, polytetrafluoroethylene, polyphenylene sulfide, polyamide imide, polyether imide, polyethylene sulfone, polyamide, polyacetal, polyphenylene oxide, polybutylene terephthalate, an ethylene-propylene-diene monomer (EPDM), sulfonated EPDM, styrene-butadiene rubber (SBR), fluoro rubber, various copolymers thereof, or a combination thereof.

The filler may inhibit expansion of the positive electrode. The filler is optional. The filler may be any suitable fibrous material which does not causing a chemical change in the lithium secondary battery. However, embodiments are not limited thereto. For example, the filler may be an olefin polymer such as polyethylene or polypropylene; or a fibrous material such as glass fiber, carbon fiber, or the like. A combination comprising at least two of the foregoing may also be used.

The amounts of the positive active material, the conducting agent, the filler, the binder, and the solvent may be determined by a person of skill in the art without undue experimentation. At least one of the conducting agent, the filler, the binder, and the solvent may be omitted depending on the desired use and structure of the lithium secondary battery.

In an embodiment, N-methylpyrrolidone (NMP) may be used as the solvent, PVdF or a PVdF copolymer may be used as the binder, and carbon black or acetylene black may be used as the conducting agent. For example, about 94 wt % of the positive active material, about 3 wt % of the binder, and about 3 wt % of the conducting agent may be mixed together to obtain a mixture in power form, and NMP may be added to the mixture to prepare a slurry having a solid content of about 70 wt %. This slurry may then be coated, dried, and roll-pressed to thereby manufacture a positive electrode plate.

The positive electrode current collector may have a thickness of about 3 μm to about 50 μm, or about 5 μm to about 40 μm, or about 5 μm to about 30 μm. The positive electrode current collector is not particularly limited, and may be any suitable material having a high conductivity which does not cause a chemical change in the fabricated battery. For example, the positive electrode current collector may be stainless steel, aluminum, nickel, titanium, sintered carbon, or aluminum or stainless steel surface-treated with carbon, nickel, titanium, or silver. A combination comprising at least two of the foregoing may also be used. The positive electrode current collector may be processed to have an uneven surface including fine projections and recesses to enhance the adhesion of the positive active material to the surface of the positive electrode current collector. The positive electrode current collector may be in any form, including a film, a sheet, a foil, a net, a porous structure, a foam, and a non-woven fabric.

The negative electrode of the lithium secondary battery according to any of the embodiments may include, for example, a negative active material containing a metal or metalloid that is alloyable with lithium, and/or a carbonaceous negative active material.

The negative active material containing a metalloid that is alloyable with lithium may include silicon (Si), a Si—C composite material including Si particles, a silicon oxide ($SiO_{a'}$, wherein 0< a'<2), or a combination thereof.

The Si particles in the Si—C composite material may have an average particle diameter of about 200 nanometers (nm) or less, or about 150 nm or less, or about 100 nm or less. For example, the Si—C composite material may have a capacity of about 600 milliampere hours per gram (mAh/g) to about 2000 mAh/g, and in some embodiments, about 800 mAh/g to about 1600 mAh/g or about 1000 mAh/g to about 1500 mAh/g.

The silicon oxide ($SiO_{a'}$) or the Si—C composite material may be combined with graphite to prepare a mixture. For example, a mixture may include about 12 wt % of the Si—C composite material having a capacity of about 1300 mAh/g, 85 wt % of graphite, and about 3 wt % of a binder, and a negative electrode having a capacity of about 500 mAh/g may be prepared using the mixture. This negative electrode including the mixture of Si—C composite material having a capacity of about 1300 mAh/g and graphite may have improved performance, relative to a negative electrode including a mixture of a silicon oxide ($SiO_{a'}$) or Si—C composite material having a capacity of about 500 mAh/g and graphite.

In addition to the above-described negative active materials, the negative electrode may further include Sn, Al, Ge, Pb, Bi, Sb, an Si—Y' alloy (wherein Y' may be an alkaline metal, an alkaline earth metal, a Group 13 to 16 element, a transition metal, a rare earth element, or a combination thereof, but is not Si), an Sn—Y' alloy (wherein Y' may be an alkaline metal, an alkaline earth metal, a Group 13 to 16 element, a transition metal, a rare earth element, or a combination thereof, but is not Sn), or a combination thereof. The element Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof.

For example, the negative electrode of the lithium secondary battery according to any of the embodiments may be prepared according to the following method.

The negative electrode may be formed by coating, drying, and pressing a negative active material composition onto a negative electrode current collector. A negative active material composition may be prepared as a mixture of such a negative active material as described above, a binder, and a solvent as needed.

Additional materials may be further added to the negative active material composition. For example, a conducting agent, a filler, or the like may be further added to the negative active material composition. The binder, the solvent, conducting agent, and the filler used in the negative active material composition may be the same as those used in the positive active material composition.

The negative active material composition may contain water as a solvent, unlike the positive active material composition. In an embodiment, the negative active material composition may include water as a solvent; carboxymethyl cellulose (CMC), styrene-butadiene rubber (SBR), an acrylate polymer, or a methacrylate polymer as a binder; and carbon black, acetylene black, or graphite as a conducting agent. To prepare the negative active material composition, about 94 wt % of a negative active material including a Si—C composite material and graphite, about 3 wt % of the binder, and about 3 wt % of the conducting agent are mixed together to obtain a mixture in powder form, and then water may be added to the mixture to prepare a slurry having a solid content of about 70 wt %. This slurry may then be coated, dried, and roll-pressed, to thereby manufacture a negative electrode.

A loading level of the negative active material composition may be determined according to the loading level of the positive active material composition.

For example, a loading level of the negative active material composition may be about 12 mg/cm$^2$ or greater, and in some example embodiments, about 15 mg/cm$^2$ or greater, or 20 mg/cm$^2$ or greater, depending on the capacity per gram of the negative active material composition. For example, the negative electrode may have an electrode density of about 1.5 g/cc or greater, and in some example embodiments, about 1.6 g/cc or greater, or 1.8 g/cc. The capacity per gram may be controlled by adjusting a weight ratio of the graphite and the Si—C composite material. A mixture of about 84 wt % of graphite having a capacity of about 360 mAh/g, about 14 wt % of the Si—C composite material having a capacity of about 1300 mAh/g, and about 2 wt % of a binder may result in the negative electrode having a capacity of about 500 mAh/g. In some other embodiments, a mixture of the Si—C composite material and the silicon oxide ($SiO_{a'}$), may result in the negative electrode having a capacity of about 380 mAh/g to about 800 mAh/g. When a capacity of the negative electrode is less than 380 mAh/g, an expected effect of the mixture may not be obtained. On the other hand, when the capacity of the negative electrode exceeds 800 mAh/g, a significant reduction in capacity retention may occur.

In some embodiments, for an energy density-oriented design, a loading level of the negative active material composition may be about 15 mg/cm$^2$ or greater to about 25 mg/cm$^2$ or less, or about 15 mg/cm$^2$ or greater to about 23 mg/cm$^2$ or less, or about 17 mg/cm$^2$ or greater to about 20 mg/cm$^2$ or less, and an electrode density of the negative electrode may be about 1.6 g/cc or greater to about 2.3 g/cc or less, or about 1.7 g/cc or greater to about 2.3 g/cc or less, or about 1.8 g/cc or greater to about 2.3 g/cc or less.

When a loading level of the negative active material and a negative electrode density are within the above-described ranges, a lithium secondary battery including such a negative active material may exhibit a high cell energy density of about 500 Wh/L or greater.

The negative electrode current collector may have a thickness of about 3 µm to about 50 µm, or about 5 µm to about 40 µm, or about 10 µm to about 30 µm. The negative electrode current collector is not particularly limited, and may be any material having suitable conductivity, and which does not produce a chemical change in the fabricated battery. For example, the negative electrode current collector may be a material such as copper, stainless steel, aluminum, nickel, titanium, sintered carbon, copper or stainless steel that is surface-treated with carbon, nickel, titanium, or silver, or an aluminum-cadmium alloy. Similar to the positive electrode current collector, the negative electrode current collector may have an uneven surface including fine projections and recesses to enhance adhesion of the negative active material to the surface of the negative electrode current collector. The negative electrode current collector may be in any form, including a film, a sheet, a foil, a net, a porous structure, a foam, or a non-woven fabric.

In some embodiments, the lithium secondary battery may exhibit an increase in a direct current internal resistance (DCIR) (e.g., a DCIR increase) of less than about 150% after 300 charge/discharge cycles at a temperature of about 45° C. under a charge/discharge current (C) of 1 C/1 C, an operating voltage in a range of about 2.8 volts (V) to about 4.3 V, and a cut-off current of $\frac{1}{10}$ C in a constant current-constant voltage (CC-CV) mode.

That is, the lithium secondary battery according to any of the embodiments may have a significantly reduced DCIR increase and improved battery characteristics, compared to a prior art high-Ni lithium secondary battery.

For example, an operating voltage of the lithium secondary battery may be from about 2.8 V to about 4.3 V, or about 2.8 V to about 4.2 V.

For example, the lithium secondary battery may have an energy density of about 500 Wh/L or greater.

In some embodiments, the lithium secondary may further include a separator between the positive electrode and the negative electrode. The separator may be an insulating thin film having a high ion permeability and strong mechanical intensity. In general, the separator may have a pore diameter of about 0.001 µm to about 1 µm, and a thickness of about 3 µm to about 30 µm. The separator may include, for example, an olefin-based polymer such as polypropylene or the like having resistance to chemicals and hydrophobic characteristics, or a sheet or non-woven fabric made of glass fiber, polyethylene, or the like. When a solid electrolyte is used, for example, a polymer electrolyte, the solid electrolyte may also serve as the separator.

In some embodiments, in addition to the above-described electrolytes, the electrolyte may further include a solid electrolyte, such as an organic solid electrolyte, or an inorganic solid electrolyte.

The organic solid electrolyte may include, for example, a polyethylene derivative, a polyethylene oxide derivative, a polypropylene oxide derivative, a phosphoric acid ester polymer, polyester sulfide, polyvinyl alcohol, polyfluoride vinylidene, a polymer including ionic dissociative groups, or a combination thereof.

The inorganic solid electrolyte may include a lithium nitride, a lithium halide, or a lithium sulfate, for example, $Li_3N$, $LiI$, $Li_5NI_2$, $Li_3N$—$LiI$—$LiOH$, or $Li_4SiO_4$—$LiI$—$LiOH$; $Li_2SiS_3$, $Li_4SiO_4$, or $Li_3PO_4$—$Li_2S$—$SiS_2$. A combination comprising at least two of the foregoing may also be used.

The lithium secondary battery according to one or more embodiments may be manufactured using any suitable method, for example, by injecting an electrolyte solution between the positive electrode and the negative electrode.

The above-described positive electrode, negative electrode, and separator may be wound or folded, and then housed in a battery case. Subsequently, an electrolyte may be injected into the battery case and the battery case may then be sealed with a cap assembly to thereby complete the manufacture of a lithium secondary battery. For example, the battery case may be a cylindrical type, a rectangular type, or a thin-film type.

The lithium secondary battery according to one or more embodiments may be a winding type or a stack type according to a shape of the electrodes. The lithium secondary battery according to one or more embodiments may be classified into a cylindrical type, a rectangular type, a coin type, or a pouch type according to the type of exterior material.

Additional details of a method of manufacturing the lithium secondary battery according to one or more embodiments are known in the art or can be determined without undue experimentation, and thus a detailed description thereof will be omitted for clarity.

In some embodiments, a plurality of lithium secondary batteries according to one or more embodiments may be used as unit cells in a battery module.

In other embodiments, the battery module may be included in a battery pack.

In some other embodiments, the battery pack may be included in a device, such as, for example, a power tool actuated by an electric motor; an electric vehicle (EV), including a hybrid electric vehicle (HEV), a plug-in hybrid electric vehicle (PHEV), or the like; an electric two-wheeled vehicle, including an electric bicycle and an electric scooter; an electric golf cart; or a power storage system. However, embodiments are not limited thereto.

A lithium secondary battery according to one or more embodiments may be used for various purposes under high-power, high-voltage, and high-temperature operating conditions.

One or more embodiments of the present disclosure will now be described in further detail with reference to the following examples. However, these examples are only for illustrative purposes and are not intended to limit the scope of the one or more embodiments of the present disclosure.

EXAMPLES

Example 1

Manufacture of Positive Electrode $LiNi_{0.8}Co_{0.15}Mn_{0.05}O_2$ as a positive active material, carbon black as a conducting agent, and PVdF as a binder were added in a weight ratio of about 94:3:3 to N-methylpyrrolidone (NMP) and mixed together. The mixture was dispersed at a loading level of 37 mg/cm$^2$ per surface to coat both surfaces of an aluminum foil having a thickness of 16 µm, dried, and then roll-pressed to prepare a positive electrode having an electrode density of 3.6 g/cc.

Manufacture of Negative Electrode

Graphite, CMC, and SBR were mixed and dispersed at a weight ratio of 98:1.5:0.5 in water, and the mixture was dispersed at a loading level of 21.86 milligrams per square centimeter (mg/cm$^2$) per surface to coat both surfaces of a copper foil having a thickness of 10 μm, dried, and then roll-pressed to prepare a negative electrode having an electrode density of 1.65 grams per cubic centimeter (g/cc).

Preparation of Electrolyte

An electrolyte was prepared by adding about 1.5 wt % of vinylene carbonate (VC) and about 1 wt % of Compound 1 (bis(4-fluorophenyl) methanedisulfonate), based on a total weight of the electrolyte, to a mixture of EC/EMC/DMC (in a volume ratio of about 2:4:4) including 1.15 M LiPF$_6$.

Compound 1

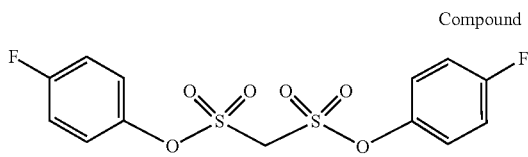 [SMILES: O=S(=O)(CS(=O)(=O)Oc1ccc(F)cc1)Oc1ccc(F)cc1]

Manufacture of Lithium Secondary Battery

A lithium secondary battery was manufactured by injecting the electrolyte between the positive electrode and the negative electrode and disposing a polypropylene separator having a thickness of about 16 μm between the positive and negative electrodes.

Example 2

A lithium secondary battery was manufactured in the same manner as in Example 1, except that about 2 wt % of Compound 1 was added, instead of about 1 wt % of Compound 1, to prepare the electrolyte.

Example 3

A lithium secondary battery was manufactured in the same manner as in Example 1, except that LiNi$_{0.85}$ Co$_{0.1}$ Mn$_{0.05}$ O$_2$ was used as the positive active material, instead of LiNi$_{0.8}$ Co$_{0.15}$ Mn$_{0.05}$ O$_2$.

Example 4

A lithium secondary battery was manufactured in the same manner as in Example 1, except that LiNi$_{0.88}$ Co$_{0.08}$ Mn$_{0.04}$ O$_2$ was used as the positive active material, instead of LiNi$_{0.8}$ Co$_{0.15}$ Mn$_{0.05}$ O$_2$.

Example 5

A lithium secondary battery was manufactured in the same manner as in Example 4, except that about 2 wt % of Compound 1 was added, instead of about 1 wt % of Compound 1, to prepare the electrolyte.

Example 6

A lithium secondary battery was manufactured in the same manner as in Example 1, except that LiNi$_{0.88}$ Co$_{0.08}$ Al$_{0.04}$ O$_2$ was used as the positive active material, instead of LiNi$_{0.8}$ Co$_{0.15}$ Mn$_{0.05}$ O$_2$.

Example 7

A lithium secondary battery was manufactured in the same manner as in Example 6, except that about 1 wt % of Compound 2 was added, instead of about 1 wt % of Compound 1, to prepare the electrolyte.

Compound 2

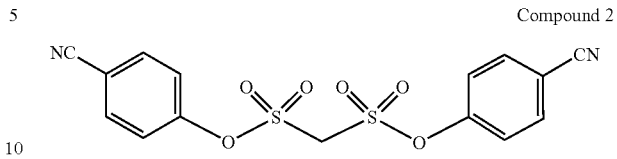

Comparative Example 1

A lithium secondary battery was manufactured in the same manner as in Example 1, except that about 1 wt % of Compound 1 was not added.

Comparative Example 2

A lithium secondary battery was manufactured in the same manner as in Example 1, except that about 1 wt % of bis-methyl methanedisulfonate was added, instead of about 1 wt % of Compound 1.

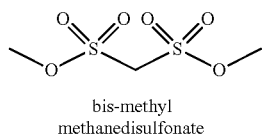

bis-methyl methanedisulfonate

Comparative Example 3

A lithium secondary battery was manufactured in the same manner as in Example 1, except that about 1 wt % of 1,2-bis(tosyloxy) ethane was added, instead of about 1 wt % of Compound 1, to prepare the electrolyte.

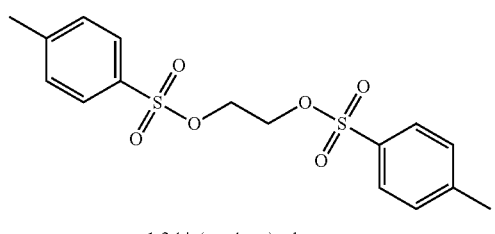

1,2-bis(tosyloxy) ethane

Comparative Example 4

A lithium secondary battery was manufactured in the same manner as in Example 1, except that about 1 wt % of Compound A (bis(fluoromethyl) methanedisulfonate) was added, instead of about 1 wt % of Compound 1, to prepare the electrolyte.

Compound A

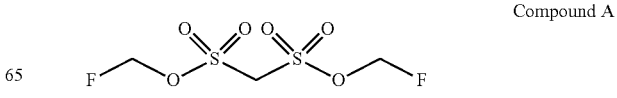

Comparative Example 5

A lithium secondary battery was manufactured in the same manner as in Example 1, except that about 1 wt % of Compound B, instead of about 1 wt % of Compound 1, was added to prepare the electrolyte.

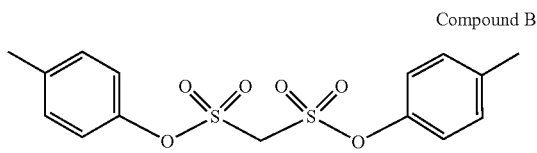

Compound B

Comparative Example 6

A lithium secondary battery was manufactured in the same manner as in Example 1, except that $LiNi_{0.6} Co_{0.2} Mn_{0.2} O_2$ was used as the positive active material, instead of $LiNi_{0.8} Co_{0.05} Mn_{0.05} O_2$.

Comparative Example 7

A lithium secondary battery was manufactured in the same manner as in Example 1, except that about 3 wt % of Compound 1 was used, instead of about 1 wt % of Compound 1.

Example 8

Manufacture of Positive Electrode

A positive electrode was manufactured in the same manner as in Example 1.

Manufacture of Negative Electrode

SCN (a material designed to exhibit a capacity of 1300 mAh/g by carbon-coating after dispersing Si particles having a size of about 100 nm on graphite particles, available from BTR), graphite, CMC, and SBR were mixed and dispersed at a weight ratio of 12:86:1.5:0.5 in water. Both surfaces of a copper foil having a thickness of 10 μm were coated at a loading level of 16.5 mg/cm² per surface, dried, and then roll-pressed to prepare an anode having an electrode density of 1.65 g/cc. Here, SCN had Si particles on graphite.

Preparation of Electrolyte

An electrolyte was prepared by adding about 1.5 wt % of vinylene carbonate (VC) and about 1 wt % of Compound 1, based on a total weight of the electrolyte, to a mixture of FEC/EC/EMC/DMC (in a volume ratio of about 7:7:46:40) including 1.15 M $LiPF_6$.

Manufacture of Lithium Secondary Battery

A lithium secondary battery was manufactured by injecting the electrolyte between the positive electrode and the negative electrode and disposing a polypropylene separator having a thickness of about 16 μm between the positive and negative electrodes.

Example 9

A lithium secondary battery was manufactured in the same manner as in Example 8, except that about 2 wt % of Compound 1 was added, instead of about 1 wt % of Compound 1, to prepare the electrolyte.

Example 10

A lithium secondary battery was manufactured in the same manner as in Example 8, except that $LiNi_{0.85} Co_{0.1} Mn_{0.05} O_2$ was used as the positive active material, instead of $LiNi_{0.8} Co_{0.15} Mn_{0.05} O_2$.

Example 11

A lithium secondary battery was manufactured in the same manner as in Example 8, except that $LiNi_{0.88} Co_{0.08} Mn_{0.04} O_2$ was used as the positive active material, instead of $LiNi_{0.8} Co_{0.15} Mn_{0.05} O_2$.

Example 12

A lithium secondary battery was manufactured in the same manner as in Example 11, except that about 2 wt % of Compound 1 was added, instead of about 1 wt % of Compound 1, to prepare the electrolyte.

Example 13

A lithium secondary battery was manufactured in the same manner as in Example 8, except that $LiNi_{0.88} Co_{0.08} Al_{0.04} O_2$ was used as the positive active material, instead of $LiNi_{0.8} Co_{0.15} Mn_{0.05} O_2$.

Example 14

A lithium secondary battery was manufactured in the same manner as in Example 13, except that about 1 wt % of Compound 2 was added, instead of about 1 wt % of Compound 1, to prepare the electrolyte.

Comparative Example 8

A lithium secondary battery was manufactured in the same manner as in Example 8, except that Compound 1 was not added.

Comparative Example 9

A lithium secondary battery was manufactured in the same manner as in Example 8, except that about 1 wt % of bis-methyl methanedisulfonate was added, instead of about 1 wt % of Compound 1, to prepare the electrolyte.

Comparative Example 10

A lithium secondary battery was manufactured in the same manner as in Example 8, except that about 1 wt % of 1,2-bis(tosyloxy) ethane was added, instead of about 1 wt % of Compound 1, to prepare the electrolyte.

Comparative Example 11

A lithium secondary battery was manufactured in the same manner as in Example 8, except that about 1 wt % of Compound A was added, instead of about 1 wt % of Compound 1, to prepare the electrolyte.

Comparative Example 12

A lithium secondary battery was manufactured in the same manner as in Example 8, except that about 1 wt % of Compound B was added, instead of about 1 wt % of Compound 1, to prepare the electrolyte.

Comparative Example 13

A lithium secondary battery was manufactured in the same manner as in Example 8, except that $LiNi_{0.6}Co_{0.2}Mn_{0.2}O_2$ was used as the positive active material, instead of $LiNi_{0.8}Co_{0.15}Mn_{0.05}O_2$.

Comparative Example 14

A lithium secondary battery was manufactured in the same manner as in Example 8, except that about 3 wt % of Compound 1 was used, instead of about 1 wt % of Compound 1.

Evaluation Example: Lifetime and Resistance Evaluation (1) Graphite as a Negative Active Material and a Disulfonate Compound as an Additive The lithium secondary batteries prepared in Examples 1 to 7 and Comparative Examples 1 to 7 were subject to 300 charge/discharge cycles at a temperature of 45° C., under a charge/discharge current of 1 C/1 C, an operating voltage in a range of about 2.8 V to about 4.3 V, and a cut-off current of $\frac{1}{10}$ C in a CC-CV mode. Then, the DCIR increase and lifespan of the lithium secondary batteries were evaluated. The results of the evaluations are shown in Table 1. Here, a lifespan was determined by calculating a percentage of the capacity after the $300^{th}$ charge/discharge cycle based on a capacity after the $1^{st}$ charge/discharge cycle under the same conditions.

lifespan=capacity after $300^{th}$ charge/discharge cycle/ capacity after $1^{st}$ charge/discharge cycle×100%

DCIR increase=DCIR after $300^{th}$ charge/discharge cycle/DCIR after $1^{st}$ charge/discharge cycle×100%

TABLE 1

| Example | Lifespan (%) | DCIR increase (%) |
| --- | --- | --- |
| Example 1 | 88 | 126 |
| Example 2 | 86 | 130 |
| Example 3 | 87 | 131 |
| Example 4 | 84 | 134 |
| Example 5 | 85 | 130 |
| Example 6 | 83 | 133 |
| Example 7 | 83 | 130 |
| Comparative Example 1 | 82 | 162 |
| Comparative Example 2 | 78 | 169 |
| Comparative Example 3 | 78 | 169 |
| Comparative Example 4 | 78 | 165 |
| Comparative Example 5 | 79 | 155 |
| Comparative Example 6 | 76 | 187 |
| Comparative Example 7 | 81 | 159 |

Referring to Table 1, the lithium secondary batteries of Examples 1 to 7, containing the electrolyte including a disulfonate-based compound, were found to have improved lifetime characteristics and reduced DCIR increase, compared to the lithium secondary batteries of Comparative Examples 1 to 5 not including a disulfonate-based compound. The lithium secondary batteries of Examples 1 to 7 containing a disulfonate-based compound were found to have improved lifetime characteristics and a DCIR increase rate of about 150% or less.

These results are attributed to that the disulfonate-based compound formed a stable protective film on the surface of the negative electrode including graphite, so that electrochemical characteristics of the negative electrode were maintained even after repeated charging and discharging cycles.

However, the lithium secondary battery of Comparative Example 6 including the positive electrode including a lower amount of Ni, relative to the lithium secondary batteries of Examples 1 to 7, was found to have a reduced lifetime and a greater DCIR increase.

The lithium secondary battery of Comparative Example 7 containing a greater content of the disulfonate-based compound, relative to the lithium secondary batteries of Examples 1 to 7, was found to have a reduced lifetime and a greater DCIR increase. Without being limited by theory, these results are attributed to decomposition of the disulfonate compound itself when used in an amount of about 3 wt % or greater in the electrolyte, thereby increasing film resistance and deteriorating battery capacity, storage stability, and cycle characteristics.

(2) Si-Graphite Composite Material as a Negative Active Material, and a Disulfonate Compound, VC, and FEC as Additives The lithium secondary batteries prepared in Examples 8 to 14 and Comparative Examples 8 to 14 were subject to 300 charge/discharge cycles at a temperature of 45° C., under a charge/discharge current of 1 C/1 C, an operating voltage in a range of about 2.8 V to about 4.3 V, and a cut-off current of $\frac{1}{10}$ C in a CC-CV mode. Then, the DCIR increase and lifespan of the lithium secondary batteries were evaluated. The results of the evaluation are shown in Table 2. Here, the lifespan and DCIR increase were determined as described above.

TABLE 2

| Example | Lifespan (%) | DCIR increase (%) |
| --- | --- | --- |
| Example 8 | 83 | 129 |
| Example 9 | 83 | 130 |
| Example 10 | 81 | 129 |
| Example 11 | 82 | 131 |
| Example 12 | 83 | 131 |
| Example 13 | 80 | 130 |
| Example 14 | 80 | 132 |
| Comparative Example 8 | 76 | 172 |
| Comparative Example 9 | 70 | 172 |
| Comparative Example 10 | 70 | 173 |
| Comparative Example 11 | 72 | 161 |
| Comparative Example 12 | 73 | 157 |
| Comparative Example 13 | 74 | 172 |
| Comparative Example 14 | 78 | 155 |

Referring to Table 2, the lithium secondary batteries of Examples 8 to 14, each containing the electrolyte including a disulfonate-based compound, were found to have improved lifetime characteristics and a reduced DCIR increase, compared to the lithium secondary batteries of Comparative Examples 8 to 14 (not including a disulfonate-based compound). The lithium secondary batteries of Examples 8 to 14, including a disulfonate compound were found to have improved lifetime characteristics and a DCIR increase of about 150% or less.

Without being limited by theory, these results are attributed to the formation of a stable protective film by the disulfonate compound on the surface of the negative electrode including the Si-graphite composite material, and as a result, electrochemical characteristics of the negative electrode were maintained even after the repeated charging and discharging cycles, as in the graphite negative electrode.

However, the lithium secondary battery of Comparative Example 13 including the positive electrode including a lower amount of Ni, relative to the lithium secondary batteries of Examples 8 to 14, was found to have a reduced lifetime and a greater DCIR increase.

The lithium secondary battery of Comparative Example 14, containing a higher content of disulfonate, relative to the lithium secondary batteries of Examples 8 to 14, was found to have a reduced lifetime and a greater DCIR increase. Without being limited by theory, these results are attributed to the decomposition of the disulfonate compound itself when used in an amount of about 3 wt % or greater in the electrolyte, thereby increasing film resistance and deteriorating battery capacity, storage stability, and cycle characteristics.

As described above, according to the one or more embodiments, an electrolyte may include, as an additive, a disulfonate-based compound of Formula 1 including a phenyl group and at least one electron withdrawing group (EWG) as a substituent. A lithium secondary battery including the electrolyte may have improved lifetime characteristics and improved resistance characteristics. According to the one or more embodiments, using a positive active material having an increased Ni content to increase capacity while using the electrolyte, a lithium secondary battery may have improved lifetime characteristics and improved resistance characteristics.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A lithium secondary battery comprising:
   a positive electrode,
   a negative electrode, and
   an electrolyte disposed between the positive electrode and the negative electrode,
   wherein the electrolyte comprises:
   a lithium salt;
   a non-aqueous solvent; and
   about 0.1 weight percent or greater to less than about 3 weight percent of a disulfonate compound represented by Formula 1, each of which is based on a total weight of the electrolyte,
   and the positive electrode comprises a positive active material represented by Formula 2:

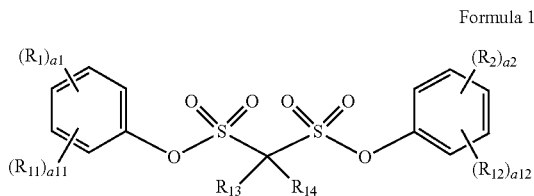

Formula 1 wherein, in Formula 1,
$R_1$ and $R_2$ are each independently a cyano group or a nitro group,
$R_{11}$ to $R_{14}$ are each independently a hydrogen, a deuterium, a fluorine, a hydroxyl group, a cyano group, a nitro group, a substituted or unsubstituted $C_1$-$C_{10}$ alkyl group, a substituted or unsubstituted $C_2$-$C_{10}$ alkenyl group, or a substituted or unsubstituted $C_2$-$C_{10}$ alkynyl group,
a1 and a2 are each independently an integer of 1 to 5,
a11 and a12 are each independently an integer of 0 to 4, and
a sum of a1 and a11 is 5, and a sum of a2 and a12 is 5;

Formula 2

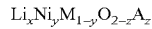

wherein, in Formula 2, 0.9≤x≤1.2, 0.1≤y≤0.98, 0≤z<0.2, M includes Al, Mg, Mn, Co, Fe, Cr, V, Ti, Cu, B, Ca, Zn, Zr, Nb, Mo, Sr, Sb, W, Bi, or a combination thereof; and
A is an element having an oxidation number of −1, −2 or −3.

2. The lithium secondary battery of claim 1, wherein the disulfonate compound represented by Formula 1 is present in an amount of about 1 weight percent to about 2 weight percent.

3. The lithium secondary battery of claim 1, wherein $R_1$ and $R_2$ are each independently a cyano group.

4. The lithium secondary battery of claim 1, wherein $R_{11}$ to $R_{14}$ are each independently a hydrogen, a substituted or unsubstituted $C_1$-$C_{10}$ alkyl group, or a substituted or unsubstituted $C_2$-$C_{10}$ alkenyl group.

5. The lithium secondary battery of claim 1, wherein a1 and a2 are each independently 1, 2, or 5.

6. The lithium secondary battery of claim 1, wherein the lithium salt comprises lithium difluoro(oxalato)borate, lithium bis(oxalato)borate, lithium difluoro bis(oxalato) phosphate, $LiBF_4$, $LiPF_6$, $LiCF_3SO_3$, $(CF_3SO_2)_2NLi$, $(FSO_2)_2NLi$, or a combination thereof.

7. The lithium secondary battery of claim 1, wherein the non-aqueous solvent comprises dimethyl carbonate, diethyl carbonate, ethyl methyl carbonate, dipropyl carbonate, methylpropyl carbonate, ethylpropyl carbonate, ethylene carbonate, propylene carbonate, butylene carbonate, or a combination thereof.

8. The lithium secondary battery of claim 1, wherein the non-aqueous solvent further includes fluoroethylene carbonate.

9. The lithium secondary battery of claim 1, wherein the positive active material is represented by Formula 3 or Formula 4:

Formula 3

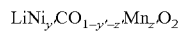

Formula 4

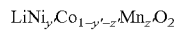

wherein, in Formula 3 and 4, $0.9 \leq x' \leq 1.2$, $0.8 \leq y' \leq 0.98$, $0 < z' < 0.1$, and $0 < 1-y'-z' < 0.2$.

10. The lithium secondary battery of claim 1, wherein the positive electrode comprises $LiNi_{0.80}Co_{0.15}Mn_{0.05}O_2$, $LiNi_{0.85}Co_{0.1}Mn_{0.05}O_2$, $LiNi_{0.88}Co_{0.08}Mn_{0.04}O_2$, $LiNi_{0.88}Co_{0.08}Al_{0.04}O_2$, $Li_{1.02}Ni_{0.80}Co_{0.15}Mn_{0.05}O_2$, $Li_{1.02}Ni_{0085}Co_{0.10}Mn_{0005}O_2$, $Li_{1.02}Ni_{0.88}Co_{00.8}Mn_{00.4}O_2$, or a combination thereof.

11. The lithium secondary battery of claim 1, wherein the lithium secondary battery has a capacity retention of about 80% or greater and a direct current internal resistance increase rate of less than about 150% after 300 charge/discharge cycles at a temperature of about 45° C.

12. The lithium secondary battery of claim 1, wherein the lithium secondary battery has a cell energy density of about 500 watt hours per liter or greater.

13. The lithium secondary battery of claim 1, further comprising a carbonate including a carbon-carbon single bond, a carbonate including a carbon-carbon double bond, a carbonate including a carbon-carbon triple bond, a carboxylic anhydride including a carbon-carbon double bond, a carboxylic anhydride including a carbon-carbon triple bond, or a combination thereof.

14. The lithium secondary battery of claim 1, further comprising a vinylene carbonate, a vinyl ethylene carbonate, a maleic anhydride, a succinic anhydride, or a combination thereof.

15. The lithium secondary battery of claim 1, further comprising a phosphorus-containing compound, a sulfur-containing compound other than the disulfonate compound represented by Formula 1, or a combination thereof, wherein the phosphorus-containing compound, the sulfur-containing compound other than the disulfonate compound represented by Formula 1, or the combination thereof is present in an amount of about 0.1 weight percent to about 2 weight percent, based on a total weight of the electrolyte.

16. The lithium secondary battery of claim 15, wherein the phosphorus-containing compound comprises a phosphine compound, a phosphite compound, or a combination thereof.

17. The lithium secondary battery of claim 1, wherein the negative electrode comprises a negative active material comprising a metal or a metalloid alloyable with lithium, a carbonaceous negative active material, or a combination thereof.

18. The lithium secondary battery of claim 17, wherein the negative active material comprising a metalloid alloyable with lithium comprises silicon, a silicon-carbon composite material, $SiO_{a'}$, wherein $0<a'<2$, or a combination thereof.

19. The lithium secondary battery of claim 1,
wherein the negative electrode comprises a negative active material comprising a silicon-carbon composite that includes silicon particles, and
wherein the silicon particles have an average particle diameter of about 200 nanometers or less.

20. The lithium secondary battery of claim 19, wherein the silicon-carbon composite includes graphite to provide the negative electrode with a capacity of 600 milliampere hours per gram (mAh/g) to about 2000 mAh/g.

* * * * *